June 17, 1930.   B. S. WATLING   1,763,840

COMBINED DUTY AND THRUST BEARING

Filed June 13, 1925

Inventor:
Burns S. Watling,
by Fisher, Fowle, Clapp & Soans, Attys.

Patented June 17, 1930

1,763,840

UNITED STATES PATENT OFFICE

BURNS S. WATLING, OF CHICAGO, ILLINOIS

COMBINED DUTY AND THRUST BEARING

Application filed June 13, 1925. Serial No. 36,791.

My invention relates to ball bearings especially adapted for horizontal shafts and the object thereof is to provide a novel, simple and reliable adjustable ball bearing which can be used to take up end thrusts as well as to act as a supporting or duty bearing and which, while adjustable as to pressure and spacing, is extremely sensitive and therefore adapted for use in connection with scales or the like, although I do not desire to be limited to any particular use.

A further object of the invention is to provide novel means for retaining the ball bearing cups in position and for adjusting the bearing and the cups to prevent undue shifting of the balls by keeping them under the desired restriction or pressure, and at the same time prevent the balls from dropping out of the raceway should the parts be disassembled or the shaft withdrawn from the bearing.

The invention further consists of certain novel combinations and arrangements of parts to be hereinafter specified.

On the drawings:—

Figure 1:
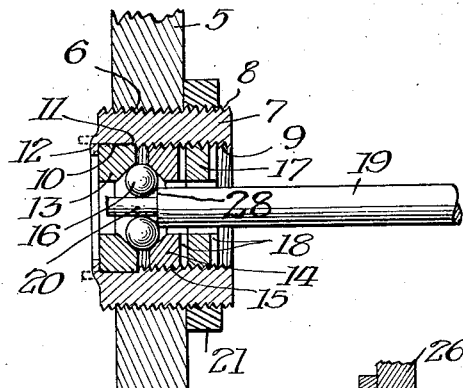
Fig. 1 is a sectional view through a ball bearing constructed in accordance with the invention.
Figure 2:
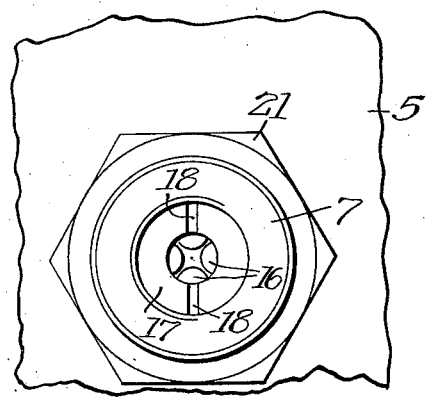
Fig. 2 is a face view looking toward the left in Fig. 1, with the shaft omitted.

Referring to the drawings in detail, 5 designates a supporting member which in Figs. 1 and 2 are shown with an internally threaded aperture 6 to take a bearing sleeve 7 which is externally threaded as at 8 for this purpose and therefore adjustable in the supporting member or wall 5. The sleeve 7, which may be in the form of a brass bushing, is internally threaded for a greater portion of its length as indicated at 9 and has a smooth part 10 in its bore, producing a shoulder 11 at the juncture thereof with the threaded part 9.

The end of the sleeve which is provided with the unthreaded bore part 10 is provided with a projecting reduced flange 12 and a ball bearing cup 13 is mounted in the sleeve at the part 10 to abut against the shoulder 11 within the bore of the sleeve and then the flange on the end of the sleeve is turned over against the outer face of the cup 13 to hold it in place. By this means a positive and economical form of retaining means for the cup 13 is provided. The other cup 14 is adjustably threaded into the screw threaded portion 9 of the bore of the sleeve 7, and by reason of the external threads 15 on the cup, cooperates with the cup 13 to provide a raceway for receiving anti-friction bearings shown in the form of balls 16. The cup 14 is held in adjusted position by means of a lock nut or plug 17 threaded into the sleeve 7 in back of the cup 14, the cup and the lock nut being provided with kerfs 18 or other suitable means for receiving a screw driver or the like for applying or removing the cup and nut or adjusting the same so that the proper relation is established between the cups to take up lost motion or play on the balls and secure any desired pressure.

A shaft 19 is shown having a reduced shouldered end 20 extending into the bearing through the apertures of the annular members mounted in the sleeve 7 and directly engages the row of balls 16. Of course, the bearings will be duplicated for the shaft to engage opposite ends thereof and rotatably support the same. It will also be apparent that the shaft may extend into the bearing from either side. The sleeve itself being externally threaded is adjustable within the supporting member or wall 5 so as to adjust the bearing as a whole to obtain the desired pressure on the shouldered cylindrical ends on the shaft 19 and to take up all lost motion and end thrust without looseness or undue friction or pressure. When the sleeve is adjusted, it may be held in adjusted position to a very minute degree by means of a lock nut 21 threaded on the sleeve 7 against one face of the supporting member 5. This adjustment in combination with the adjustment of the cup 14, permits the bearing to act both as a thrust bearing and as a supporting or duty bearing for the shaft 19 and it can be so adjusted that while all lost motion or play is taken up, nevertheless a very sensitive bearing is provided which has been found of particular value for the shaft of a weighing scale, since it will support a considerable weight and at the same time will eliminate friction. Of course, I do not restrict myself to this particular use. It is also to be particularly noted that the parts are so arranged that the reduced ends of the shafts bear directly on and are supported by the balls, and if the shaft is withdrawn from the bearing, the balls will be retained in position in their races, thus overcoming objections to previous ball bearing structures in which the balls would drop out.

Figure 3:
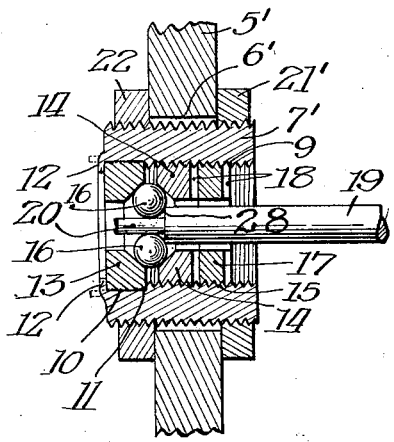
Figs. 3 and 4 are sectional views corresponding to Fig. 1, of slightly modified structures.

In Fig. 3 of the drawings the structure of the bearing is the same as that shown and described in connection with Figs. 1 and 2 except that instead of having the sleeve 7 with its external threads engaging the internal threads of the opening in the supporting member 5, a supporting member 5' is provided with a smooth bore 6' loosely receiving the sleeve 7' and lock nuts 21' and 22 are threaded on opposite ends of the sleeve 7' to engage opposite faces or sides of the supporting member 5' and clamp the sleeve 7' in any desired position. Of course, this provides means for adjusting the bearing as an entirety.

Figure 4:
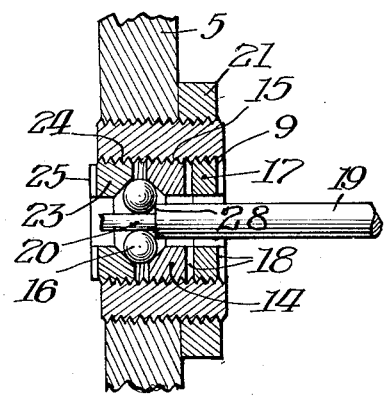

In Fig. 4 of the drawing the structure is the same as that shown in Fig. 1 except that in lieu of the ball bearing cup or cone 13, smoothed externally to engage a smooth part 10 of the bore of the sleeve and held in position by the shoulder 12 flanged over against the same by pressure, a threaded cup 23 is provided to engage a threaded part 24 of the bore of the sleeve which is internally threaded throughout its length. The cup 23 is also provided with kerfs 25 to take a screw driver or spanner tool for application, adjustment or removal.

Figure 5:
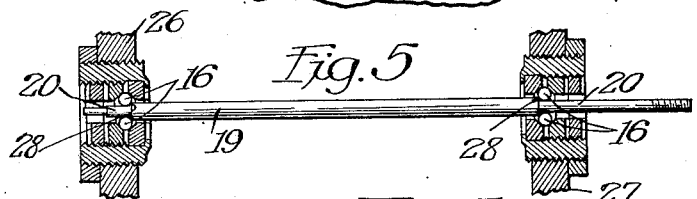
Fig. 5 is a sectional view illustrating an application of the invention.

In Fig. 5 of the drawing, the shaft 19 is shown engaging bearings in opposed spaced frame members 26 and 27 of a weighing scale or the like, although it is to be understood that the device and structure are capable of application to a variety of uses or mechanisms. The bearings are mounted in the frame members as previously described and engaged by the reduced cylindrical ends of the shaft 19, with the shoulders 28 facing outwardly, opposing one another in engagement with the balls of the bearings to support the weight thereon as well as take up end thrust.

Obviously, changes may be made in the details set forth without departure from the essentials of the invention as defined in the claims.

I claim as my invention:

1. An anti-friction bearing device for a shaft of the type having a reduced diameter at its supported portion forming a shoulder having a face perpendicular to the axis of the shaft, comprising a sleeve carried by a support within which the shaft is supported, complementary ball race elements within the sleeve mounted to be adjustable with respect to the balls carried thereby, and the balls therewithin being seated directly on the reduced diameter of the shaft and against the shoulder to anti-frictionally mount the shaft and take up end thrust, the sleeve being adjustable with respect to the support and axially of the shaft to take up play and looseness between the balls and the shoulder.

2. An anti-friction bearing device for a shaft of the type having a reduced diameter at its supported portion forming a shoulder having a face perpendicular to the axis of the shaft, comprising an externally threaded sleeve carried adjustably by a support and within which the shaft is supported, a portion of said sleeve being threaded internally, complementary ball race elements, one carried by the internally threaded portion of the sleeve for adjustment, and the balls within the elements being seated directly on the reduced diameter of the shaft and against the shoulder to anti-frictionally mount the shaft and take up end thrust, the sleeve being adjustable with respect to the support and axially of the shaft to take up play and looseness between the balls and shoulder, and an integral extension on the sleeve bent in to retain one of the ball race elements in the unthreaded portion of the sleeve.

3. An anti-friction bearing device for a shaft of the type having a reduced diameter at its supported portion forming a shoulder having a face perpendicular to the axis of the shaft, comprising an externally threaded sleeve carried adjustably by a support and within which the shaft is supported, locking means for holding the sleeve in adjusted position, a portion of said sleeve being threaded internally, complementary ball race elements, one adjustably carried by the internally threaded portion of the sleeve, and the other carried in the unthreaded portion of the sleeve, the balls within said elements being seated directly on the reduced diameter of the shaft and against the shoulder to anti-frictionally mount the shaft and take up end thrust, the sleeve being adjustable with respect to the support and axially of the shaft to take up play and looseness between the balls and shoulder, and an integral extension on the sleeve bent down to retain in place the ball race element carried in the unthreaded portion of the sleeve.

4. In an anti-friction bearing device for a shaft having supporting portions of reduced diameter forming shoulders facing outwardly in opposite directions and each having a face perpendicular to the axis of the shaft, comprising a sleeve carried by a support for each end of the shaft, complementary ball race elements within each sleeve mounted to be adjustable with respect to the balls carried thereby, and the balls therewithin being seated directly on the reduced portions of the shaft and against the shoulders to antifrictionally mount the shaft and take up end thrust, the sleeves being adjustable with respect to the supports and axially of the shaft to take up play and looseness between the balls and the shoulders.

5. In a device of the class described, the combination of a shaft having a bearing portion of reduced uniform diameter and forming a shoulder, a support, a sleeve mounted on said support, complementary ball race elements mounted and relatively adjustable in said sleeve, balls interposed between said race elements and directly engaging the reduced bearing portion and shoulder of the shaft to support the latter and take up end thrust, said sleeve being adjustable relatively to the support and axially of the shaft to take up end play between the balls and the shoulder of the shaft, substantially as described.

6. In a device of the character described, the combination of a shaft having bearing portions of reduced uniform diameter forming outwardly facing shoulders at the inner ends of the bearing portions, supporting members, sleeves carried by said supporting members, complementary ball race elements mounted and relatively adjustable in each of said sleeves, balls interposed between said elements and directly engaging the reduced bearing portions and shoulders of the shaft to support the same and take up end thrust, said sleeves being relatively adjustable with respect to the supports and axially of the shaft to take up end play between the balls and shoulders of the shaft, substantially as described.

BURNS S. WATLING.